US008578818B2

(12) United States Patent
Jezek

(10) Patent No.: US 8,578,818 B2
(45) Date of Patent: Nov. 12, 2013

(54) DEVICE FOR SAVING ENERGY DURING VERTICAL AND HORIZONTAL MOTIONS WHEREIN THE RESISTING TORQUE CAN BE SPLIT INTO TWO TORQUES OPPOSING EACH OTHER

(76) Inventor: Giorgio Jezek, Cognola di Trento (IT)

( * ) Notice: Subject to any disclaimer, the term of this patent is extended or adjusted under 35 U.S.C. 154(b) by 0 days.

(21) Appl. No.: 13/498,108

(22) PCT Filed: Feb. 24, 2011

(86) PCT No.: PCT/IB2011/050777
§ 371 (c)(1),
(2), (4) Date: Mar. 23, 2012

(87) PCT Pub. No.: WO2011/104683
PCT Pub. Date: Sep. 1, 2011

(65) Prior Publication Data

US 2012/0304817 A1 Dec. 6, 2012

(30) Foreign Application Priority Data

Feb. 26, 2010 (WO) .................. PCT/IT2010/000085

(51) Int. Cl.
*F16H 1/20* (2006.01)

(52) U.S. Cl.
USPC .................. 74/665 GC; 74/665 GE; 74/420; 74/421 A

(58) Field of Classification Search
USPC ........... 74/665 GC, 665 GE, 420, 421 A, 423
See application file for complete search history.

(56) References Cited

U.S. PATENT DOCUMENTS

| | | | | |
|---|---|---|---|---|
| 4,047,451 | A * | 9/1977 | Ackerman | 74/665 H |
| 4,610,583 | A * | 9/1986 | Malzkorn et al. | 409/211 |
| 5,319,418 | A * | 6/1994 | Fujimoto et al. | 399/167 |

FOREIGN PATENT DOCUMENTS

| | | | |
|---|---|---|---|
| DE | 199 48 946 | A1 | 4/2001 |
| EP | 0 631 967 | A2 | 1/1995 |
| EP | 1 270 488 | A2 | 1/2003 |
| EP | 2 013 960 | A0 | 1/2009 |
| WO | 2007/129150 | A1 | 11/2007 |

* cited by examiner

*Primary Examiner* — Ha D Ho
(74) *Attorney, Agent, or Firm* — Pearne & Gordon LLP

(57) ABSTRACT

A mechanical device for reducing the energy absorbed by an electrical motor of a hoisting plant. The device includes at least one first rotating member moved by the motor of the hoisting plant. The device also includes a second rotating member connected to the first member through a gear transmission. At least one third rotating member is connected to the second rotating member through a bevel-gear transmission. The device further includes a fourth rotating member operatively connected to the rotor of the electric motor. The fourth rotating member and the third rotating member are connected through a transmission with flexible elements or through a gear transmission which develop a transmission ratio equal to unity. The transmission elements of the device are designed to enable rotation of the fourth rotating member in a direction of rotation concordant with that of the first rotating member.

23 Claims, 3 Drawing Sheets

DEVICE FOR SAVING ENERGY DURING VERTICAL AND HORIZONTAL MOTIONS WHEREIN THE RESISTING TORQUE CAN BE SPLIT INTO TWO TORQUES OPPOSING EACH OTHER

FIELD OF THE INVENTION

The present invention falls within the field of production of hoisting plants, such as, for example, lifts or cup elevators. In particular, the present invention regards a mechanical device for reducing the energy absorbed by the electric motor of a hoisting plant. The present invention also relates to a hoisting plant comprising a mechanical device according to the present invention.

STATE OF THE ART

As is known, the majority of hoisting plants, for example lifts, cup elevators, or the like, comprise a driving unit provided for enabling movement of one or more transport units. In the majority of cases, the driving unit comprises an electric motor, whereas the transport units are designed to transport objects or persons according to the operating situation. In the case, for example, of a hoisting plants of a lift type, the driving unit is constituted by an electric motor (synchronous, asynchronous, or gearless), whereas the transport unit is constituted by a cab for transporting persons. The electric motor generally drives a rotation pulley, over which hoisting cables are run. Connected to a first end of the cables is a cab, whereas connected to a second end is a counterweight.

It is likewise known that the movement of the cab from a first position to a second position imposes an operation of the motor that can be divided into three phases: a first, acceleration, phase; a second phase at substantially constant speed; and a third, deceleration, phase. In the acceleration phase, the motor is required to deliver the maximum power to overcome the inertia of the system. In the deceleration phase, the motor functions as generator for braking rotation of the motor until it comes to a complete stop.

In the step at constant speed, the electric motor delivers onto its motor shaft a torque that can be considered defined as the sum of two contributions. The first of these contributions is the one necessary to overcome the difference of weight existing between the cab (Ca+Q) and the counterweight, whereas the second is the one necessary to overcome the passive resistance, where the term "passive resistance" refers in general to friction and efficiency.

The frequent use of hoisting plants, in particular in the case of lifts, has highlighted the need to develop new technical solutions that will enable reduction as much as possible of the energy absorbed by the electric motor and hence of the overall energy required by operation of the system. Said need arises not only in regard to newly designed and built systems, but also with reference to existing systems that have been in operation for years.

Consequently, the task of the present invention is to provide a device for reduction of the energy absorbed by the electric motor of a hoisting plant during operation thereof.

Within this task, a purpose of the present invention is to provide a device that can be adapted to different hoisting plants, amongst which, for example, lifts or cup elevators.

Another purpose of the present invention is to provide a device that is easy to assemble and is made up of a relatively reduced number of components.

Not the least important purpose is to provide a device that is reliable and easy to produce at competitive costs.

SUMMARY OF THE INVENTION

The present invention regards a mechanical device for reducing the energy absorbed by an electric motor of a hoisting plant. The mechanical device according to the invention comprises at least one first rotating member, which is to be driven in rotation by the electric motor of the hoisting plant to which the device is applied. The device also comprises a second rotating member connected to the first member through first transmission means that develop a transmission ratio substantially equal to unity. At least one third rotating member is connected to the second rotating member through second transmission means that develop a transmission ratio equal to unity. The device further comprises a fourth rotating member, operatively connected to the rotor of the electric motor. The fourth rotating member and the third rotating member are connected through third transmission means, which develop a transmission ratio substantially equal to unity. In particular, according to the invention the fourth rotating member rotates in a way concordant with the first rotating member.

The present invention also regards a hoisting plant comprising an electric motor that actuates at least one transport unit through a system of cables and/or belts. The hoisting plant according to the invention comprises a mechanical device according to the invention for reducing the energy absorbed by the electric motor of the system itself.

LIST OF FIGURES

Further characteristics and advantages of the present invention will emerge clearly from the description of two embodiments, illustrated by way of non-limiting example in the attached drawings, in which.

DETAILED DESCRIPTION

The device 1 according to the invention can be installed in any hoisting or transporting plant in general provided with a motor and at least one transport unit driven by the motor itself through a system of cables and/or belts. In particular, it has been seen that the device 1 according to the invention is particularly advantageous when it is installed in hoisting plants 2 equipped with an electric motor of the type indicated in the patent application No. EP2013960 filed in the name of the present applicant. In particular, said motor M comprises an external body connected to the rotor part of the motor itself. On said external body grooves 4B are defined, which are to house hoisting cables Fs and, as specified hereinafter, further flexible elements (belts and/or cables) corresponding to motion-transmission means of the device 1 according to the invention.

Figure 2:
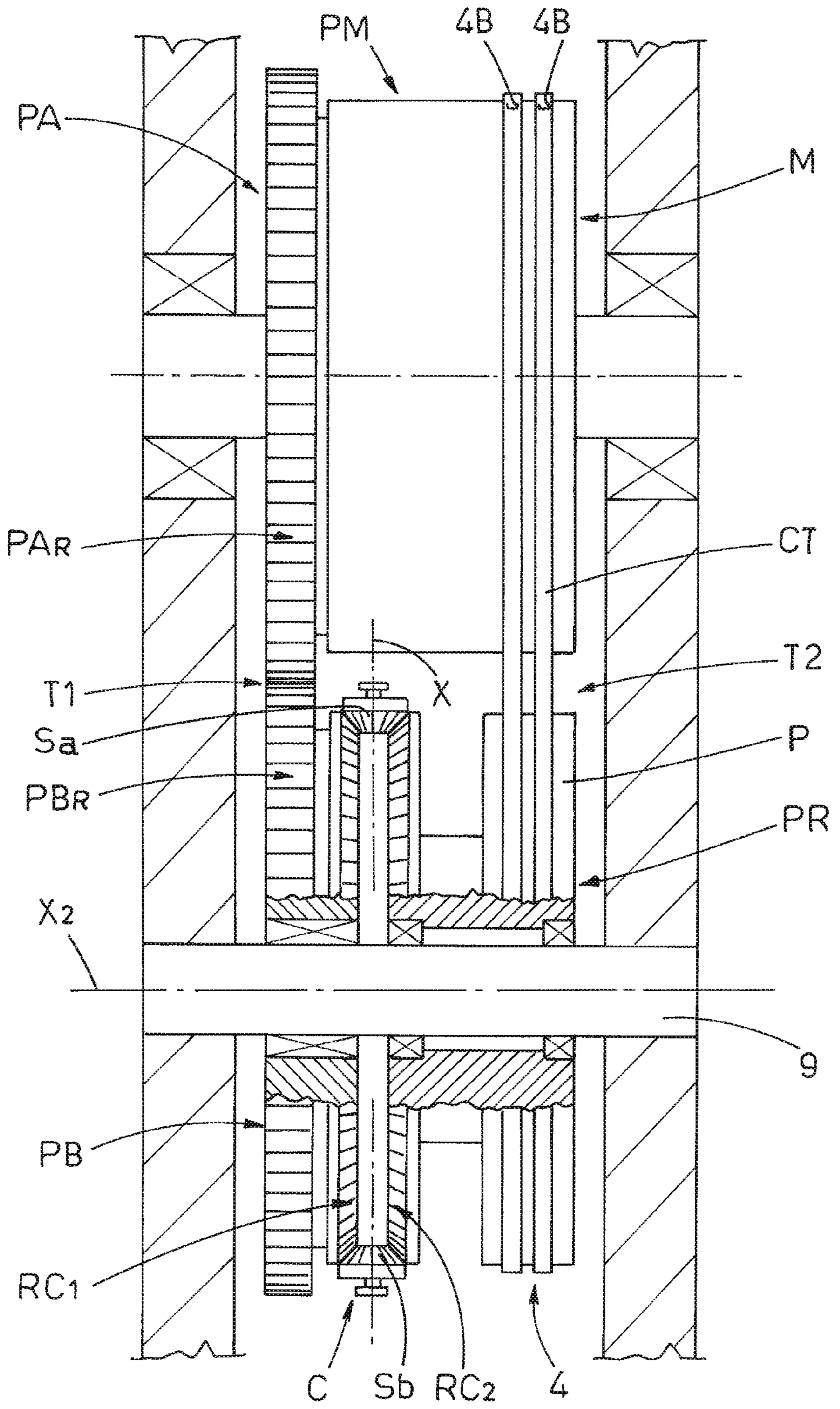
FIG. 2 is a top plan view of a possible embodiment of a device according to the present invention.

The device 1 comprises at least one first rotating member PA which is to be driven, i.e., brought into rotation, by the electric motor M of a hoisting plant 2 to which the device is applied. In detail, the first rotating member PA is moved by the motor M through a connection, which develops a transmission ratio substantially equal to unity. Said connection is such as to render the first member PA fixed with respect to the motor M, as illustrated in FIGS. 2 and 3.

The device 1 also comprises a second rotating member PB, connected to the first member PA through first transmission means T1 that develop a transmission ratio substantially equal to unity. The mechanical device 1 also comprises a third rotating member PR, connected to the second rotating member PB through second transmission means C that develop a transmission ratio equal to unity. The device 1 further comprises a fourth rotating member PM, operatively connected to the rotor of the motor M and connected to the third rotating member PR through third transmission means T2 that develop a transmission ratio substantially equal to unity.

Figure 3:
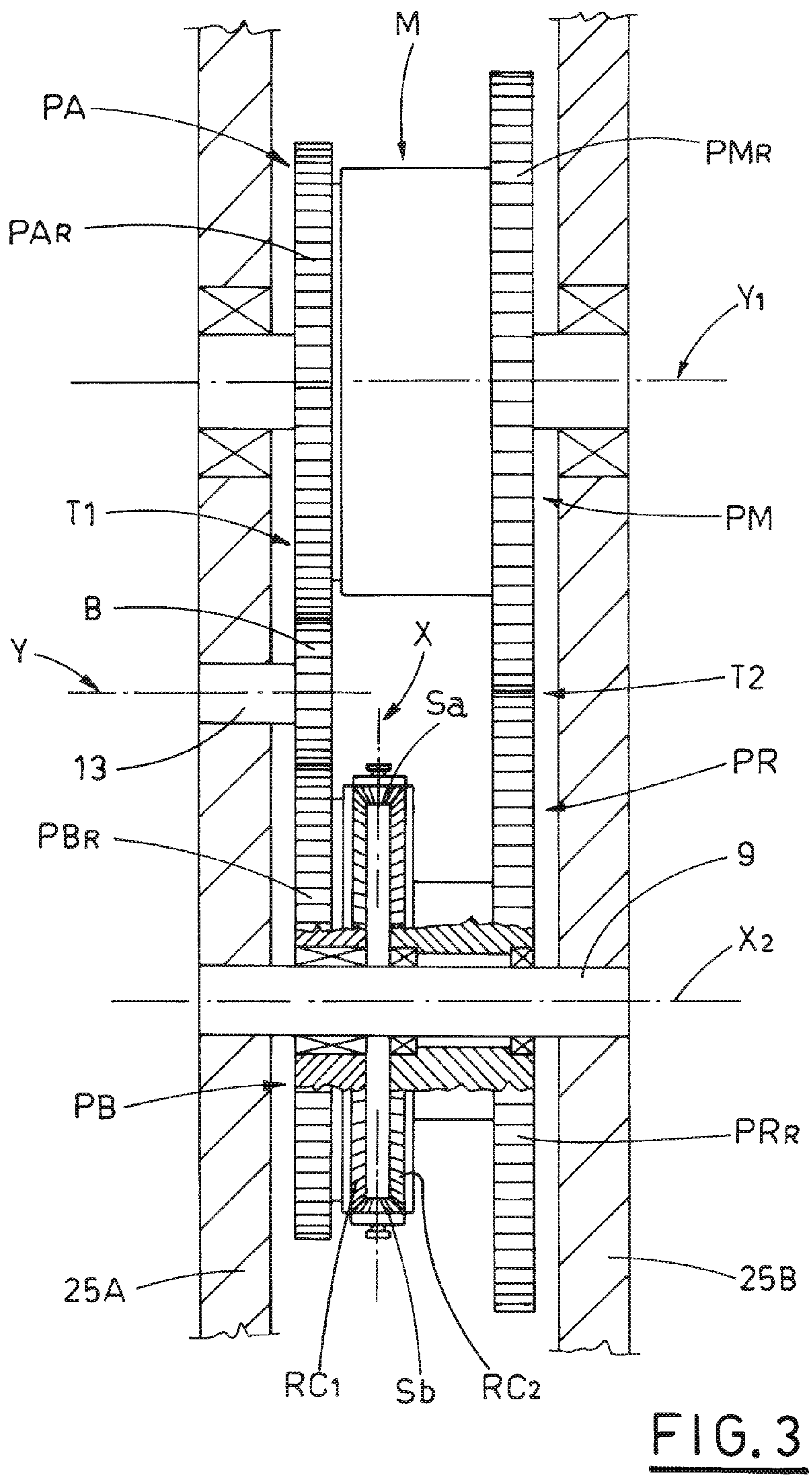
FIG. 3 is a top plan view regarding a further possible embodiment of a device according to the present invention.

The fourth rotating member PM can be formed by an external part of the motor M connected to the rotor thereof (see FIGS. 2 and 3) or alternatively can be formed by an element fitted coaxially on the rotor itself (see FIG. 3). As described in detail hereinafter, the third transmission means T2 can comprise a transmission with flexible elements (for example, ropes) that operatively connect the third rotating member PR to the outer body of the motor M (fourth rotating member PM) as illustrated in the embodiments in FIGS. 2 and 3. Alternatively, the third transmission means T2 can comprise a gear transmission formed by two or more gears that operatively connect the third rotating member PR to the fourth rotating member PM.

According to the present invention the first transmission means T1, the second transmission means C, and the third transmission means T2 are configured in such a way that the fourth rotating member PM will turn in a direction of rotation concordant with the rotor of the motor shaft M. In other words, the transmission means T1, C, T2 are configured in such a way that the fourth rotating member PM tends to rotate in a counterclockwise direction when the rotor of the motor M also rotates in a counterclockwise direction, and vice versa.

It has been seen that through the device 1 it is possible to obtain, as compared to traditional solutions that do not envisage it, a reduction of the torque required of the motor M (i.e., a reduction of the power used) during operation of the hoisting plant. In the case, for example, of a plant 2 of the lift type it may be seen that the device 1 enables reducing of the torque necessary to overcome the difference in weight between the cab and the counterweight in conditions of motor M working. This condition of equilibrium is advantageously maintained also during rise or descent of the lift. It follows that in this operating phase, the motor M will have to generate a torque (and hence absorb a power) that must be sufficient to overcome only the passive resistance (friction, efficiency of the transmission means, T1, C and T2) and to overcome the difference in weight between the cab and the counterweight.

In the field of hoisting movement we should have the following:

$$Q \leq ca; Cp = Ca + \tfrac{1}{2}Q; O \leq Z \leq \tfrac{1}{2}Q$$

where Z is the difference in weight between the cab loaded and the counterweight. To obtain a good energy saving in the acceleration and deceleration phases of the possible elevator cab and counterweight (in the case of the present example), the static torque or the deceleration torque should never exceed Z×r (where r is the radius of the motor that carries out hoisting). In order to arrive at this it will be expedient to consider the effective capacity of the cab, which is lower by a certain percentage than the capacity: Q≤ca. We thus obtain that the torque that is generated in acceleration and deceleration will not exceed the value of Z×r, which is the limit torque that is split into two torques that oppose each other. It is emphasized that, in the traditional solutions so far known, in deceleration the motor, which becomes a generator, throws away in resistance the energy that it produces, which is thus dispersed.

Figure 1:
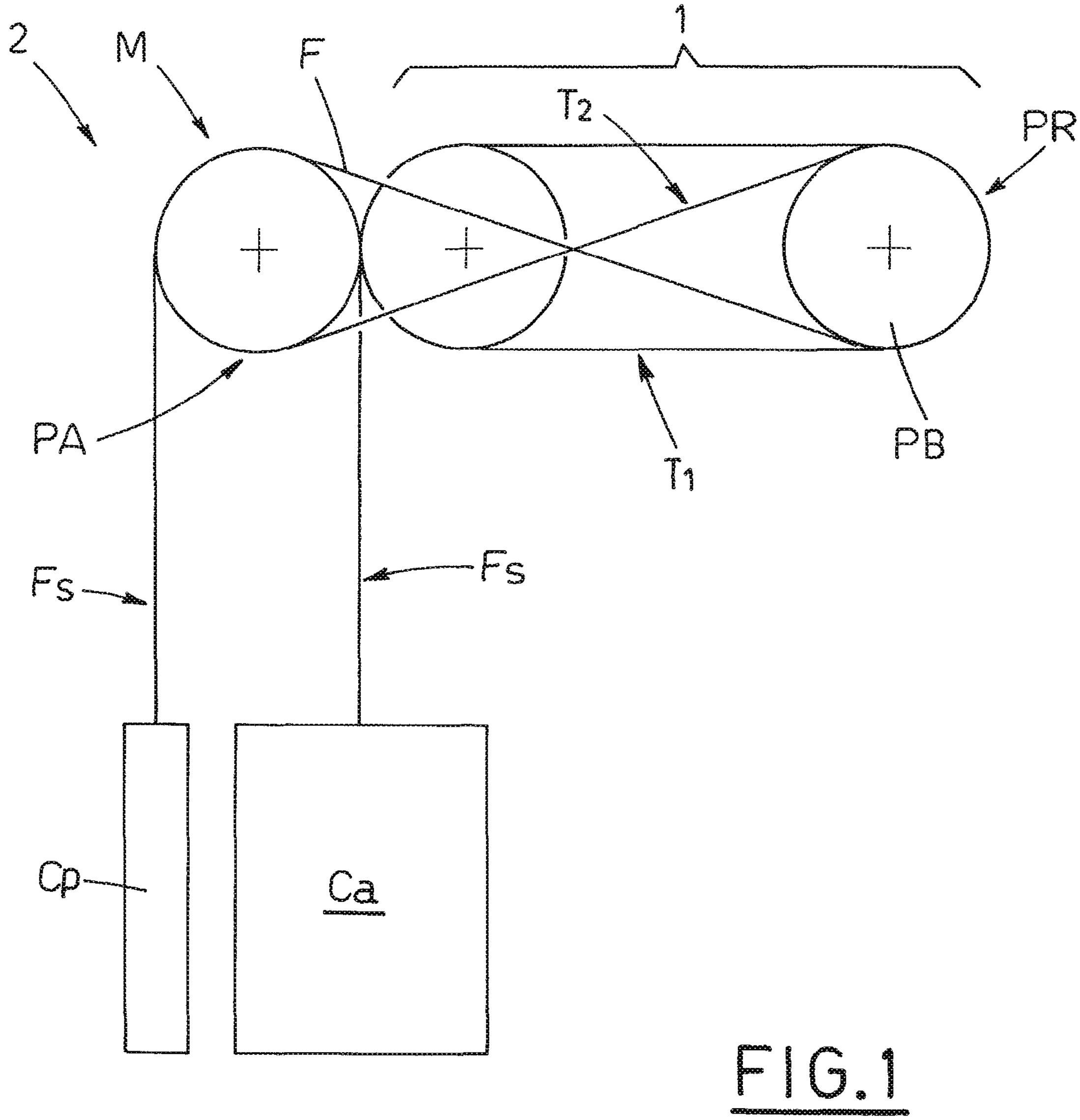
FIG. 1 is a schematic view of a hoisting plant of the lift type comprising a device according to the present invention.

FIG. 1 is a schematic view of hoisting plant 2 of the lift type provided with a device 1 according to the invention. The hoisting plant 2 is provided with an electric motor M and a plurality of hoisting cables Fs that are run over respective pulleys driven by the rotor (or motor shaft) of the motor M. A first end of the cables Fs supports a cab C having a weight Ca and a capacity Q. Anchored instead to the other end is a counterweight Cp, the weight of which is chosen so as to be Cp=Ca+½Q.

In the configuration shown schematically in FIG. 1, the device 1 according to the invention is installed according to a substantially "horizontal" arrangement, i.e., in such a way that the axes of rotation of the first rotating member PA and of the second rotating member PB are substantially parallel. Alternatively, the device 1 could also be installed according to a "vertical" arrangement, i.e., such that the axis of rotation of the motor M of the first member PA and of the second member PB are on one and the same vertical plane.

FIG. 2 is a top plan view regarding a first possible embodiment of a device 1 according to the present invention. According to this first solution, the first rotating member PA is connected to the motor M in such a way as to be fixed with respect thereto (same speed of rotation). The second rotating member PB is instead "idle" on a countershaft 9 which rotates about an axis X2 parallel to that of the rotor of the electric motor M. The second member PB is connected to the first member PA through the first transmission means T1, which comprise a gear transmission. In particular, the first member PA and the second member PB each comprise a gear PAr, PBr. Said gears PAr, PBr mesh each other, developing a transmission ratio equal to unity and defining said gear transmission. In particular, the gear PAr is fitted on the rotor R of the motor M and the gear PBr is mounted idle on said countershaft 9.

Once again with reference to FIG. 2, in this embodiment the second transmission means C comprise a bevel-gear transmission, which is configured in such a way that the third rotating member PR will turn in a direction of rotation opposite to that of the second rotating member PB. On the hypothesis, for example, that the latter turns in a clockwise direction, through the bevel-gear transmission the third member PB is driven in a counterclockwise rotation, and vice versa. It should be noted that, according to the solution in FIG. 2, the third rotating member PR rotates in a direction concordant with that of the first rotating member PA.

The bevel-gear transmission comprises a first bevel gear RC1, fixed with respect to the second rotating member PB, i.e., fixed with respect to the gear PBr. The transmission also comprises a second gear RC2 fixed with respect to the third rotating member PR, and a pair of planetary gears Sa, Sb (preferably, but not exclusively, two in number), which rotate around a fixed axis of rotation X, which is substantially orthogonal to the axis of rotation X2 of the countershaft 9. Said planetary gears Sa, Sb are responsible for reversal of the direction of rotation between the second member PB and the third member PR. The latter is idle on the same countershaft 9 on which also the gear PBr of the second rotating member PB is idle.

The third transmission means T2 provided for connecting the third member PR to the fourth member PM comprise a transmission with flexible elements and preferably with V belts CT. More precisely, the flexible-element transmission comprises two or more V belts CT run over the external body of the motor M, and a pulley P, which basically constitutes the third rotating member PR.

Said belts CT are held in the correct operative position by means of the grooves 4, 4B purposely made on the body of the pulley P and on the external body of the motor M. In this connection, it should be noted that the external body of the motor M comprises a number of grooves 4B equal to the sum of the number of hoisting cables FS of the system and of the V belts CT of the third transmission means T2. It should be noted that the V belts CT are run over the pulley P and the external body of the motor M in such a way that the third rotation member PR and the fourth rotation member PM tend to rotate in substantially concordant directions of rotation. The direction of rotation of the fourth rotating member PM will be in any case concordant with that of the first rotating member PA, i.e., of the rotor of the motor M on which the first member PA itself is fitted. It should moreover be noted that the diameter of the grooves designed to house the hoisting cables and the diameter of the grooves designed to house the V-belts is equal to unity.

FIG. 3 regards a third possible embodiment of a device 1 according to the present invention. In particular, in this further embodiment the first rotating member PA comprises a first gear PAr fixed with respect to the rotor of the electric motor M. Likewise, the second rotating member PB comprises a gear PBr operatively connected to the gear PAr of the first member PA through first transmission means T1. In a way similar to the solution illustrated in FIG. 2, the gear PBr of the second rotating member PB is mounted idle on a countershaft 9 supported by two longitudinal beams 25A, 25B which support, on opposite sides, also the electric motor M.

The first transmission means T1 comprise a gear transmission, including a return gear B which rotates about an axis Y parallel to the axis of rotation Y1 of the motor M (i.e., of the gear PAr) and parallel to the axis X2 of the countershaft 9, i.e., to the axis of rotation of the gear PBr of the second rotating member PB. In particular, the return gear B is mounted idle on a shaft 13, supported, via appropriate supports, by a longitudinal beam 25A. It should be noted that in this embodiment the gear transmission that defines the first of transmission T1 hence comprises the gears PAr, B and PBr, which develop a transmission ratio equal to unity according to the purposes of the present invention.

In a way similar to what is envisaged for the solution of FIG. 2, also in the third embodiment illustrated in FIG. 3 the second transmission means C comprise a bevel-gear transmission configured in such a way that the third rotating member PR turns in a direction opposite to that of the second member PB. From a constructional point of view, the second transmission means C hence correspond to the ones already described for the solution in FIG. 2. In particular, the bevel-gear transmission comprises a first bevel gear RC1 fixed with respect to the second rotating member PB, i.e., fixed with respect to the gear PBr. The transmission likewise comprises a second gear RC2, fixed with respect to the third rotating member PR, and a pair of planetary gears Sa, Sb (preferably, but not exclusively two in number), which turn about a substantially fixed axis of rotation X orthogonal to the axis of rotation X2 of the countershaft 9. Said planetary gears Sa, Sb are responsible for reversal of the direction of rotation between the second member PB and the third member PR. The latter is idle on the same countershaft 9 as that on which the gear PBr of the second rotating member PB is also mounted idle.

It should be noted, instead, that unlike the embodiment of FIG. 2, in the embodiment of FIG. 3 the first rotating member PA (i.e., the gear PAr) and the second rotating member PB (i.e., the gear PBr) have the same direction of rotation, whereas the third rotating member PR has, instead, a direction of rotation concordant with that of the return gear B referred to above. In other words, the return gear B renders concordant the directions of rotation of the first rotating member PA and of the second rotating member PB, which has in any case a direction of rotation disconcordant with that of the third rotating member PR.

Once again with reference to the embodiment of FIG. 3, the third transmission means T2 are also formed by a gear transmission. Said solution hence proposes itself as an alternative to the one illustrated in FIG. 2, where the third transmission means T2 comprise a flexible-element transmission.

In greater detail, in the solution of FIG. 3, the third rotating member PR comprises a gear PRr sharing the axis of rotation X2 of the second rotating member PB, i.e., the axis of rotation of the bevel gears RC1 and RC2, which define the second transmission means C. Also the fourth rotating member PM comprises a gear PMr fitted on the shaft of the motor M on the opposite side with respect to the position of the gear PAr defining the first rotating member PA. The gear PMr of the fourth rotating member PM and the gear PRr of the third rotating member PR have a diameter that is substantially equivalent so as to present the same r.p.m., i.e., so as to develop a transmission ratio equal to unity. It should moreover be noted that the gear PMr of the fourth rotating member PM has a direction of rotation opposite to that of the gear PRr of the third rotating member PR and concordant, instead, with that of the gear PAr of the first rotating member PA. Basically, also in the solution in FIG. 3 the direction of rotation of the fourth rotating member PM is in any case concordant with that of the first rotating member PA, i.e., with that of the rotor to which both of the members (PA and PM) are fitted.

The present invention also regards a hoisting plant 2 comprising an electric motor M that actuates at least one transport unit through a system of cables and/or belts. The hoisting plant 2 according to the invention comprises a mechanical device 1 according to the invention for reducing the energy absorbed by the electric motor of the system itself. The hoisting plant 2 can be of the lift type or alternatively could also be constituted by a cup elevator or any other plant for moving material that uses flexible transmission elements for actuation of the unit or units for transporting the loads.

The present invention also regards the use of the mechanism above described for saving energy in a hoisting system and/or in a system for horizontal movement in which the resistant torque can be split into two contrasting torques.

The technical solutions adopted for the mechanical device enable the pre-set task and purposes to be fully achieved. In particular, the mechanical device advantageously enables reduction of the power absorbed by the electric motor during operation of the hoisting plant to which the motor is associated. In addition, the completely mechanical device enables said reduction of energy without intervening on the structure of the electric motor. It should be noted also that the mechanism is obtained using a relatively small number of components that can be assembled at contained costs. It is then emphasized that the mechanisms described above can create an energy saving not only in hoisting plants, and within certain limits, but also in horizontal movement, where the resistant torque can be split into two torques that counter one another and cancel out.

The mechanical device thus conceived may undergo numerous modifications and variations, all of which fall within the scope of the inventive idea; in addition, all the items may be replaced by other technically equivalent ones.

In practice, the materials used, as well as the contingent dimensions and shapes, may be any whatsoever according to the requirements and the state of the art.

The invention claimed is:

1. A mechanical device (1) for reducing the energy absorbed by an electric motor (M) of a hoisting plant (2), wherein said device (1) comprises:

a first rotating member (PA), connected to said motor (M) through a connection that develops a transmission ratio substantially equal to unity;

a second rotating member (PB), connected to the first member (PA) through first transmission means (T1) that develop a transmission ratio substantially equal to unity;

a third rotating member (PR), connected to said second rotating member (PB) through second transmission means (C) that develop a transmission ratio substantially equal to unity;

a fourth rotating member (PM), integral with the rotor of said motor (M) and connected to said third member (PR) through third transmission means (T2) that develop a transmission ratio substantially equal to unity, in which said fourth member (PM) rotates in a way concordant with said first rotating member (PA);

said first transmission means (T1), second transmission means (C) and third transmission means (T2) being formed by bodies separated from each other.

2. The mechanical device (1) according to claim 1, wherein said first rotating member (PA) is fixed with respect to the shaft of said motor (M).

3. The mechanical device (1) according to claim 1, wherein said first transmission means (T1) comprise a gear transmission that develops a transmission ratio equal to unity.

4. The mechanical device according to claim 1, wherein said first member (PA) comprises a gear (PAr), which is fixed with respect to the rotor of said electric motor (M), and said second member (PB) comprises a gear (PBr) mounted idle on a countershaft (9) so as to turn about an axis of rotation (X2) parallel to that of the rotor of said electric motor (M), said gear (PAr) of said first member (PA) and said gear (PBr) of said second member (PB) being such as to mesh with one another, developing a transmission ratio equal to unity.

5. The mechanical device according to claim 4, wherein said second transmission means (C) comprise a bevel-gear transmission configured in such a way that said third rotating member (PR) turns in a direction of rotation opposite to that of said second rotating member (PB), said bevel-gear transmission comprising a first bevel gear (RC1), fixed with respect to said second gear (PBr), and a second bevel gear (RC2), fixed with respect to said rotating member (PR), said bevel-gear transmission comprising at least one planetary gear (Sa, Sb) that rotates about a fixed axis (X) substantially orthogonal to said axis of rotation (X2) of said countershaft (9) in such a way as to transmit the movement of rotation from said first bevel gear (RC1) to said second bevel gear (RC2).

6. The mechanical device according to claim 5, wherein said gear transmission comprises a pair of planetary gears (Sa, Sb).

7. The mechanical device according to claim 4, wherein said third transmission means (T2) comprise a flexible-element transmission (CT).

8. The mechanical device according to claim 7, wherein said rotating member (PM) is formed by an external cylindrical body of said motor (M), fixed with respect to the rotor of the motor itself, said external body comprising a plurality of grooves for housing hoisting cables (Fs) and said flexible elements (CT) of said third transmission means (T2).

9. The mechanical device according to claim 8, wherein said flexible elements (CT) comprise a plurality of V belts.

10. The mechanical device according to claim 8, wherein the transmission ratio between the diameter of the grooves designed to house said cables and the diameter of the grooves designed to house said V belts is equal to unity.

11. The mechanical device according to claim 9, wherein the transmission ratio between the diameter of the grooves designed to house said cables and the diameter of the grooves designed to house said V belts is equal to unity.

12. The mechanical device according to claim 1, wherein said first rotating member (PA) comprises a gear (PAr), fixed with respect to said electric motor (M), and said second rotating member (PB) comprises a gear (PBr) mounted idle on a countershaft (9) so as to turn about an axis of rotation (X2) parallel to that of the rotor of said electric motor (M), said first transmission means (T1) comprising a return gear (B) set between said gear (PAr) of said first rotating member (PA) and said gear (PBr) of said second rotating member, said gear (PAr) of said first rotating member (PA) and said gear (PBr) of said second rotating member (PB) having the same diameter.

13. The mechanical device according to claim 12, wherein said second transmission means (C) comprise a bevel-gear transmission configured in such a way that said third rotating member (PR) turns in a direction of rotation opposite to that of said second rotating member (PB), said bevel-gear transmission comprising a first bevel gear (RC1) fixed with respect to said second gear (PBr) and a second bevel gear (RC2) fixed with respect to said third rotating member (PR), said bevel-gear transmission comprising at least one satellite gear (Sa, Sb), which rotates about a fixed axis (X) substantially orthogonal to said axis of rotation (X2) of said countershaft (9) so as to transmit the movement of rotation from said first bevel gear (RC1) to said second bevel gear (RC2).

14. The mechanical device according to claim 13, wherein said gear transmission comprises a pair of satellite gears (Sa, Sb).

15. The mechanical device according to claim 12, wherein said third transmission means (T2) comprise a gear transmission, which develops a transmission ratio equal to unity.

16. The mechanical device according to claim 13, wherein said third transmission means (T2) comprise a gear transmission, which develops a transmission ratio equal to unity.

17. The mechanical device according to claim 14, wherein said third transmission means (T2) comprise a gear transmission, which develops a transmission ratio equal to unity.

18. The mechanical device according to claim 15, wherein said third rotating member (PR) comprises a gear (PRr) fixed with respect to the second bevel gear (RC2) and mounted idle on said countershaft (9) and wherein said fourth rotating member (PM) comprises a gear (PMr) mounted on said rotor of said electric motor (M), said gear (PRr) of said third rotating member (PR) meshing directly with said gear (PMr) of said fourth rotating member (PM) so as to define said gear transmission of said third transmission means (T2).

19. The mechanical device according to claim 16, wherein said third rotating member (PR) comprises a gear (PRr) fixed with respect to the second bevel gear (RC2) and mounted idle on said countershaft (9) and wherein said fourth rotating member (PM) comprises a gear (PMr) mounted on said rotor of said electric motor (M), said gear (PRr) of said third rotating member (PR) meshing directly with said gear (PMr) of said fourth rotating member (PM) so as to define said gear transmission of said third transmission means (T2).

20. The mechanical device according to claim 17, wherein said third rotating member (PR) comprises a gear (PRr) fixed with respect to the second bevel gear (RC2) and mounted idle on said countershaft (9) and wherein said fourth rotating member (PM) comprises a gear (PMr) mounted on said rotor of said electric motor (M), said gear (PRr) of said third rotating member (PR) meshing directly with said gear (PMr) of said fourth rotating member (PM) so as to define said gear transmission of said third transmission means (T2).

21. The mechanical device according to claim 4 wherein the second transmission means (C) comprise a bevel-gear transmission configured in such a way that the third rotating member (PR) turns in a direction opposite to that of the second member (PB); said bevel-gear transmission comprising a first bevel gear (RC1) fixed with respect to the second rotating member (PB), a second gear (RC2) fixed with respect to the third rotating member (PR), and at least one planetary gear (Sa, Sb) which turn about a substantially fixed axis of rotation (X) orthogonal to the axis of rotation (X2) of the countershaft (9); said planetary gear (Sa, Sb) being configured for reversal of the direction of rotation between the second member (PB) and the third member (PR).

22. The mechanical device according to claim 4 wherein the third member (PR) is idle on the same countershaft (9) as that on which the gear (PBr) of the second rotating member (PB) is also mounted idle.

23. The mechanical device according to claim 21 wherein the third member (PR) is idle on the same countershaft (9) as that on which the gear (PBr) of the second rotating member (PB) is also mounted idle.

* * * * *